May 13, 1930.  H. G. NORWOOD  1,758,848
SPRING NUT LOCKING DEVICE FOR RAIL JOINTS
Filed July 2, 1929
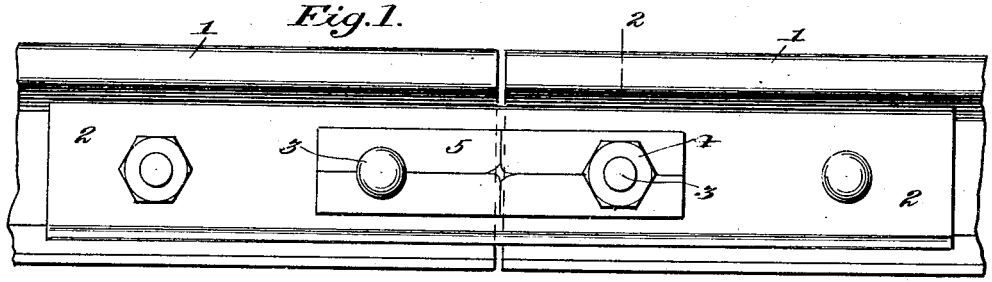
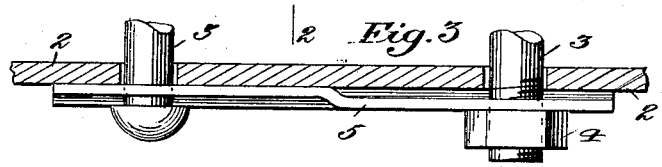
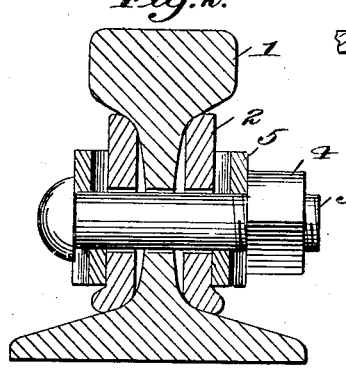
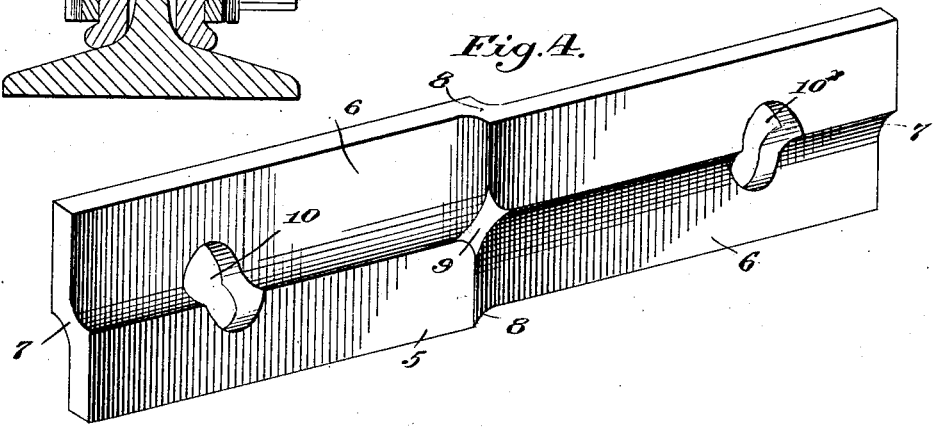
Inventor:
Harry G. Norwood,
by Jas. L. Skidmore
Att'y.

Patented May 13, 1930

1,758,848

UNITED STATES PATENT OFFICE

HARRY G. NORWOOD, OF NEW YORK, N. Y., ASSIGNOR TO THEODORE F. VON DORN, OF NEW YORK, N. Y.

SPRING NUT-LOCKING DEVICE FOR RAIL JOINTS

Application filed July 2, 1929. Serial No. 375,379.

This invention relates to an improved and novel spring nut locking device, especially designed for utilization in connection with railway joints.

The prime object of the invention is to provide, simple, strong, durable, economical, reliable and effective means whereby the meeting ends of the rails will be safely locked and maintained in proper alinement.

Another object of the invention is to so construct an efficient and practical means from a single piece of spring metal made in bars of the desired dimensions, then by suitable dies stamped into a peculiar formation forming a bar depressed at opposite sides of its longitudinal central portion, and in diagonal relationship from its vertical central portion to each opposite end thereof, thus forming a device for securely locking two bolts and nuts at one and the same time, and furnishing the required spring resistance against the nut under any and all conditions when the nut shall have been properly adjusted to the threaded end of the securing bolt.

The foregoing and such other objects as may appear from the ensuing description are accomplished by the construction, arrangement, location, combination and formation of the several parts hereinafter more fully described, illustrated in the accompanying drawings and particularly pointed out in the claims appended hereto, it being understood that slight changes in the precise shape, proportions and minor details of construction may be resorted to without departing from the spirit or sacrificing any of the advantages of the invention.

In the accompanying drawings forming a part of this specification it will be seen that:—

Figure is a side elevation of the means embodying my invention used in connection with a railway joint.

Figure 2 is a transverse section thereof, taken in the plane of the dotted lines 2—2, Fig. 1.

Figure 3 is a plan view of the spring nut locking device, nut and bolts, showing in longitudinal section a portion of the rail joint splice bar broken away, and Figure 4 is a perspective view of the spring locking bar detached from the rail joint.

In the embodiment of my invention as illustrated, it will be seen that the numeral 1 designates the track rails, 2 the rail clamping or splice bars, each of said bars being formed with openings therethrough for the reception of the securing bolts 3, each bolt being passed through a suitable opening formed through the track rail and the openings in the splice bars, and securely fitted to the threaded end portion of each bolt is a securing nut 4, said nuts being preferably fitted so as to alternate on opposite sides of the rail joint.

It will be readily perceived that this invention provides a novel and peculiarly constructed locking bar or plate 5 made of a single piece of metal, preferably formed from a heat treated spring steel of the desired quality usually employed for like purposes, said plate being adapted to overlap the meeting ends of the rails and is firmly and tightly secured under high spring tension in contact with the outer face of each of the clamping or splice bars 2 by the two securing bolts and nuts disposed nearest the meeting ends of the track rails, each locking plate 5 being stamped or forged by the medium of suitable dies with a depressed portion 6 extending substantially from its vertical center to each outer end thereof, and formed with an oppositely disposed angular portion 7 at each end thereof, and with an angular formation 8 disposed in opposite directions at its vertical central portion, and having a central portion 9 in a plane with both the inner and the outer face of said bar or plate and a bolt opening 10 near each end, said bar being so constructed that either face thereof may be secured adjacent to and in contact with the outer face of the clamping or splice bar 2.

It will be clearly evident from this particular construction of locking bar or plate that when it shall have been firmly secured in contact with the rail clamping or splice bar 2, by the proper adjustment and tightening of the securing nuts fitted to the bolts, each section of the plate both at the right and left of its vertical center will be under high spring tension against the inner face of the nut thereby forcing the nut under extreme pressure into contact with the threaded portion of the bolt, hence when each nut shall have been completely and properly adjusted all accidental turning or loosening of the nuts, usually caused by the excessive jarring that emanates from the rolling stock passing over the joints, will be prevented.

It will also be obvious that in the event that the splice bar should become accidentally broken, this type of locking plate possessing unusual strength will readily serve to retain the rails in proper alinement until the break is discovered and repaired, thereby preventing what is known as "lipping" of the track rails which is liable to cause a derailment of the rolling stock.

It will be understood that any required or desired number of holes may be formed through the end portions of the track rails and through the splice bars, and that any suitable number of bolts and securing nuts may be employed in the proper locking and securing of the rail joints.

Having thus described my invention what I claim and desire to secure by Letters Patent is:

1. A rail joint locking plate formed from a single piece of spring steel having its central portion formed with oppositely disposed angular shouldered portions and a longitudinal angular portion formed from its central portion to each end thereof.

2. A rail joint locking plate or bar made from a single piece of spring metal, and formed with diagonally oppositely disposed depressed portions extending from its central portion to each end thereof.

3. A rail joint locking bar or plate made from a single piece of spring steel, and formed with a diagonally oppositely disposed surface at each side of its longitudinal central portion in a plane with the middle central portion, and extending from its vertical center to each end thereof.

4. A rail joint locking bar or plate made from a single piece of spring steel, and formed with a longitudinal oppositely disposed angular portion at each side of the vertical center, and with an oppositely disposed angular formation at its central portion at each side of its longitudinal center.

5. A rail joint locking plate made from a single piece of spring steel, and formed with an outwardly and an inwardly disposed portion at each side of both its longitudinal and vertical central portions.

HARRY G. NORWOOD.